J. E. Quinn,
Pipe Coupling

N°. 23,811.                    Patented Apr. 26, 1859.

Witnesses.                    Inventor.

UNITED STATES PATENT OFFICE.

JAMES E. QUINN, OF CHICAGO, ILLINOIS, ASSIGNOR TO JOHN M. JOHNSTON, OF SAME PLACE.

JOINT FOR GAS AND WATER PIPES.

Specification of Letters Patent No. 23,811, dated April 26, 1859.

*To all whom it may concern:*

Be it known that I, JAMES E. QUINN, of the city of Chicago, in the county of Cook and State of Illinois, have invented a new and Improved Mode of Constructing and Forming Joints of Gas and Water Pipes and other Similar Purposes; and I do hereby declare that the following is a full and exact description thereof, reference being had to the accompanying drawings and to the letters of reference marked thereon.

The nature of my invention, consists, in arranging two rings or flanges at the end of one pipe, leaving a space between the rings. I form the ordinary socket chamber on the end of the other pipe, intended to be attached to first mentioned pipe, the end of the pipe furnished with the said ring being inserted in and fitting the socket. A circular chamber is formed by the rings and inclosed by the socket. I then form a hole or opening through the band of the socket into the chambers, and pour through the opening into the chamber a liquid cement until the chamber is filled. The cement must be of such composition that it will harden, and must not shrink in hardening. The joining of the pipes will be complete without the use of lead, thereby avoiding large expense and labor.

To enable others skilled in the art to make and use my invention I will proceed to describe the arrangement and construction of the joint, reference being had to the annexed drawings making a part of this specification, in which—

Figure 1:
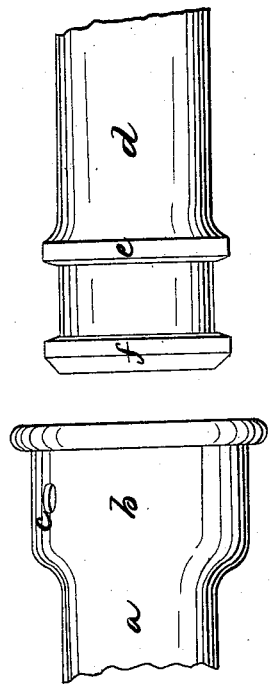
Figure 2:
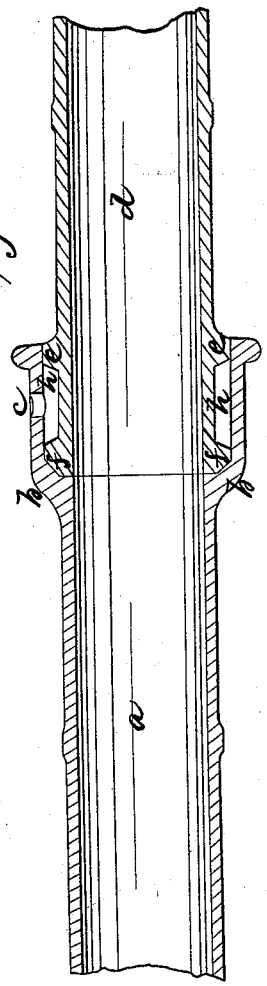
Figure 3:
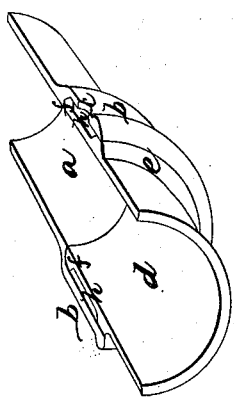

Figure 1 is an exterior view of the two pipes before they are connected. Fig. 2 is a longitudinal section of the pipes connected, and Fig. 3 is a perspective view of a similar section of pipe.

$a$, represents a pipe having the ordinary socket $b$; $c$ represents an opening or hole in one side of the socket $b$; $d$, is a similar pipe furnished with the rings or flanges $e$, $f$, the flange $f$ being beveled to fit the seat formed in the base of the socket as shown on Figs. 2 and 3; by inserting the end of pipe $d$ into socket of pipe $a$, the rings $e$ and $f$ form the chambers $h$, $h$, Figs. 2 and 3; this chamber being filled with cement poured in through opening $c$ the joint is complete. I sometimes place a gasket of clay on the bevel of the ring $f$, which being pressed upon the seat at the base of the socket prevents the escape of the cement (through any imperfection of the joint) into the pipe.

What I claim as my invention and desire to secure by Letters Patent is,

The arrangement of the rings $e$, and $f$, on pipe $d$, in combination with the opening $c$ in the socket $b$, forming the cement chambers $h$, $h$; for the purpose of joining pipes air and water tight by using cements in place of lead commonly used—the whole arranged substantially as above set forth.

JAMES E. QUINN.

Witnesses:
GEO. F. LETZ,
W. H. CHENOWETH.